(12) United States Patent
Blangé

(10) Patent No.: US 7,431,104 B2
(45) Date of Patent: Oct. 7, 2008

(54) DEVICE FOR TRANSPORTING PARTICLES OF A MAGNETIC MATERIAL AND TOOL COMPRISING SUCH A DEVICE

(75) Inventor: Jan-Jette Blangé, Rijswijk (NL)

(73) Assignee: Shell Oil Company, Houston, TX (US)

( * ) Notice: Subject to any disclaimer, the term of this patent is extended or adjusted under 35 U.S.C. 154(b) by 295 days.

(21) Appl. No.: 10/563,887

(22) PCT Filed: Jul. 8, 2004

(86) PCT No.: PCT/EP2004/051407

§ 371 (c)(1),
(2), (4) Date: Jan. 9, 2006

(87) PCT Pub. No.: WO2005/005766

PCT Pub. Date: Jan. 20, 2005

(65) Prior Publication Data

US 2006/0185907 A1    Aug. 24, 2006

(30) Foreign Application Priority Data

Jul. 9, 2003 (EP) ................................. 03077159
Apr. 14, 2004 (EP) ................................. 04101507

(51) Int. Cl.
*E21B 7/18* (2006.01)
(52) U.S. Cl. ............................. 175/54; 175/67; 175/424
(58) Field of Classification Search ................... 166/99, 166/66.5, 55, 298; 175/54, 67, 424
See application file for complete search history.

(56) References Cited

U.S. PATENT DOCUMENTS

| 3,375,886 A | 4/1968 | Goodwin et al. ............... 175/66 |
| 3,489,280 A | 1/1970 | Israelson et al. ............ 209/223 |
| 3,831,753 A | 8/1974 | Gaylord et al. ............. 209/399 |
| 3,952,857 A | 4/1976 | Nazuka ....................... 198/41 |

(Continued)

FOREIGN PATENT DOCUMENTS

DE    2052516    4/1972

(Continued)

OTHER PUBLICATIONS

International Search Report dated Sep. 13, 2004 (PCT/EP2004/051407).

*Primary Examiner*—David J Bagnell
*Assistant Examiner*—Robert E Fuller (57) ABSTRACT

A device for transporting magnetic particles in a selected direction has a support surface extending in the selected direction, a magnet arranged to generate a magnetic field for retaining the particles on the support surface such that the magnetic field on the support surface has high- and low-field bands and a magnetic field gradient zone between the high- and low-bands, means for advancing the high- and low-bands relative to the support surface in a direction having a component in the direction of the gradient, wherein along the high-field band at least first and second magnetic poles of opposite polarity are arranged such that a first magnetic path on the support surface from the first pole to the second pole is shorter than a second magnetic path on the support surface crossing the gradient zone from the first pole to any other nearest pole of opposite polarity.

15 Claims, 8 Drawing Sheets

U.S. PATENT DOCUMENTS

| | | | | |
|---|---|---|---|---|
| 4,993,503 | A | 2/1991 | Fischer et al. | 175/62 |
| 5,170,891 | A | 12/1992 | Barrett | 209/223.2 |
| 6,412,643 | B1 | 7/2002 | Wysolmierski | 209/213 |
| 6,510,907 | B1 | 1/2003 | Blange | 175/67 |
| 6,702,940 | B2 | 3/2004 | Blange | 210/222 |
| 7,017,684 | B2 | 3/2006 | Blange | |
| 2002/0079998 | A1* | 6/2002 | Blange | 335/302 |

FOREIGN PATENT DOCUMENTS

| | | |
|---|---|---|
| DE | 2832037 | 1/1980 |
| SU | 924334 | 4/1982 |
| WO | 02/34653 | 5/2002 |
| WO | 02/092956 | 11/2002 |
| WO | 2005/005765 A1 | 1/2005 |
| WO | 2005/005766 A1 | 1/2005 |
| WO | 2005/005767 A1 | 1/2005 |
| WO | 2005/005768 A1 | 1/2005 |
| WO | 2005/038189 A1 | 4/2005 |
| WO | 2005/040546 A1 | 5/2005 |

* cited by examiner

DEVICE FOR TRANSPORTING PARTICLES OF A MAGNETIC MATERIAL AND TOOL COMPRISING SUCH A DEVICE

PRIORITY CLAIM

The present application claims priority of European Patent Application No. 03077159.6 filed 09 Jul. 2003 and European Patent Application No.04101507.4 filed 14 Apr. 2004.

Field of the Invention

The present invention relates to a device for transporting particles of a magnetic material in a selected direction.

In a second aspect the invention relates to a tool for excavating an object comprising such a device.

BACKGROUND OF THE INVENTION

A device for transporting particles of a magnetic material in a selected direction is described in International publication WO 02/34653. The known device contains a cylindrical magnet concentrically arranged within a support member formed by a cylindrical sleeve, of which sleeve the outer surface forms a support surface for supporting the particles. The cylindrical magnet is formed of three smaller magnets stacked together in the axial direction of the separator magnet. Each of the smaller magnets has diametrically opposed N and S poles, and the smaller magnets are stacked in a manner that adjacent magnets have oppositely oriented N-S directions.

The magnet is at its outer surface provided with a number of helical grooves, in order to locally increase the radial distance between the magnet and the support surface to cause regions of lower magnetic field strength. Between these regions of lower magnetic field there are bands of higher magnetic field. The magnet has a central longitudinal axis about which the magnet is rotatable relative to the sleeve. In operation, magnetic particles are retained on the support surface by the magnetic field generated by the cylindrical separator magnet. In particular, the magnetic particles are retained in the regions between the helical grooves where the magnetic field is relatively stronger. Due to axial rotation of the separator magnet, the magnetic particles experience a moving gradient of magnetic field strength perpendicular to the helical groove, which the particles will follow. In this way the particles are transported over the support surface.

It has been found that there is a limit to the number of particles per time unit that the known device is able to transport for a given rotation frequency. If the number of particles that is offered to the device exceeds the limit, the transport of the magnetic particles along the support surface has been found to decline or even stop completely.

SUMMARY OF THE INVENTION

According to a first aspect of the invention, there is provided a device for transporting particles of a magnetic material in a selected direction, the device comprising:

a support member having a support surface for supporting the particles, the support surface extending in the selected direction;

a separator magnet arranged to generate a magnetic field for retaining the particles on the support surface whereby the magnetic field on the support surface is arranged to have a high-field band, a low-field band, and a magnetic field gradient in a gradient zone between said high- and low-field bands whereby the magnetic field strength in the high-field band is higher than that in the low-field band;

means for advancing the high- and low-field bands relative to the support surface in a direction having a component in the direction of the magnetic field gradient on the support surface, whereby the high-field band is followed by the low-field band; whereby along said high-field band at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

For the purpose of the present specification, a magnetic pole is an area on the separator magnet surface or the support surface where magnetic field lines cross the separator magnet surface or the support surface thereby appearing as an area of source or sink for magnetic field lines.

It has been found that the magnetic particles, when present in a high abundance on the support surface, tend to arrange themselves in chains on the support surface extending between N and S poles of the magnetic field impinging the support surface. By arranging neighbouring N and S poles within the high-field band to be magnetically closer to each other than to poles of opposite polarity on the other side of the gradient zone, the chains of magnetic particles will have a preference to align with the high-field band against the gradient zone. The magnetic particles aligned this way will all experience the force field resulting from the magnetic field gradient in the advancing gradient zone.

Chains of magnetic particles crossing the gradient zone from a magnetic pole inside the high-field band to a magnetic pole outside the high-field band are undesired. Since these chains cross the gradient zone, only a relatively small number of particles in the chain will experience the force gradient associated with the magnetic field gradient in the gradient zone, such that advancement of this zone does not effectively drag the particles in the chain along with it. The arrangement of magnetic poles in accordance with the invention leads to avoidance of such chains of magnetic particles crossing the gradient zone.

In accordance with the second aspect of the invention, there is provided a tool for excavating an object, the tool comprising a jetting system arranged to impinge the object to be excavated with a jetted stream of a fluid mixed with abrasive particles comprising a magnetic material, the jetting system being provided with at least an abrasive particle inlet for allowing entrance of abrasive particles into the jetting system, the tool further comprising a recirculation system arranged to recirculate at least some of the abrasive particles, from a return stream of the fluid mixed with the abrasive particles downstream impingement of the jetted stream with the object back to the jetting system, the recirculation system comprising a device in accordance with any one of the previous claims arranged with the support surface exposed to said return stream for transporting the abrasive particles from the return stream to the inlet.

BRIEF DESCRIPTION OF THE DRAWINGS

The invention will now be illustrated by way of example, with reference to the accompanying drawing wherein.

DETAILED DESCRIPTION OF THE INVENTION

In the figures, like parts carry identical reference numerals. Where, in the following description, a direction of rotation is specified, the direction of transport is each time the viewing direction in relation to which the rotary direction is defined.

Figure 1:
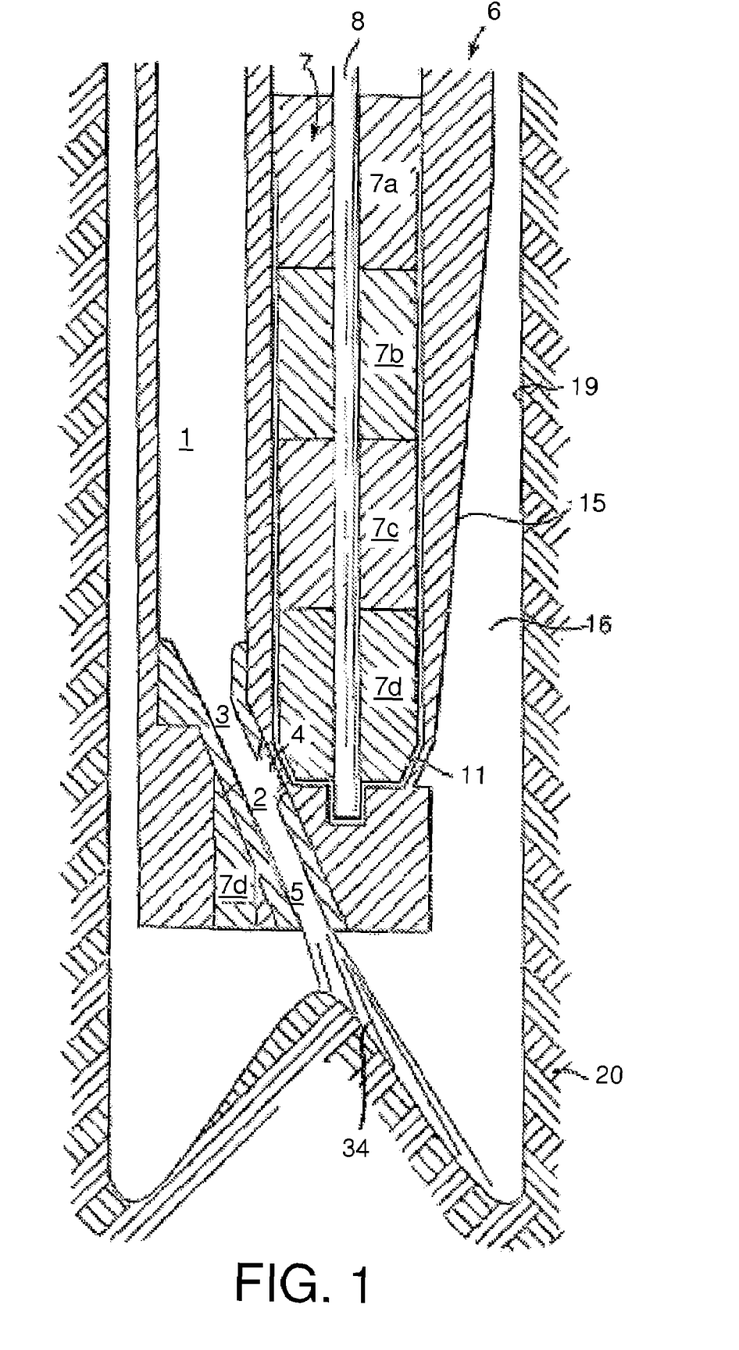
FIG. 1 is a schematic longitudinal cross section of a tool for excavating an object constructed in accordance with an embodiment of the present invention, shown in a borehole.

Part of a tool for excavating an object is schematically shown in longitudinal section in FIG. 1. The tool can be connected to the lower end of a drill string (not shown) extending into a borehole 19 formed in an object such as an earth formation 20. The tool is arranged to jet a stream 34 of drilling fluid mixed with abrasive particles against the object to be excavated and to recirculate at least part of the abrasive particles. The abrasive particles must be magnetisable for this tool.

The tool is provided with a longitudinal drilling fluid passage 1, which is at one end thereof in fluid communication with a drilling fluid channel provided in the drill string and at the other end thereof in fluid communication with a mixing chamber 2 via a drilling fluid inlet 3.

The mixing chamber 2 is also in fluid communication with an abrasive particle inlet 4 for abrasive particles, and with a mixing nozzle 5 having an outlet (not shown) arranged to jet a stream of drilling fluid and abrasive particles against the earth formation during drilling with the drilling tool in the borehole.

The mixing chamber is provided with a body of magnetic material 14 on the side opposite from the abrasive particle inlet 4, but this is optional.

The mixing nozzle is arranged inclined relative to the longitudinal direction of the drilling tool at an inclination angle of 15-30° relative to vertical, but other angles can be used. Preferably the inclination angle is about 21° which is optimal for abrasively eroding the bottom of the bore hole by axially rotating the complete tool inside the bore hole. The mixing chamber 2 and mixing nozzle 5 are aligned with the outlet nozzle under the same angle, in order to achieve optimal acceleration of the abrasive particles.

The drilling fluid passage 1 is arranged to bypass a device 6 for transporting magnetic particles that is included in the tool as part of a recirculation system for the magnetic abrasive particles which can be used if the abrasive particles contain a magnetic material. The device 6 includes a support member in the form of a slightly tapered sleeve 15 for providing a support surface extending around an essentially cylindrically shaped elongate separator magnet 7. The separator magnet 7 generates a magnetic field for retaining the magnetic particles on the support surface 15.

The drilling fluid passage 1 is fixedly arranged relative to the support surface 15 and the mixing chamber 2. The drilling fluid passage 1 has a lower end arranged near the abrasive particle inlet 4. In the present embodiment the drilling fluid passage 1 is formed inside a ridge in the axial direction which ridge is in protruding contact with the support surface 15. The drilling fluid passage 1 may alternatively be arranged freestanding from the support surface in a manner similar to that shown and described in International Publication WO 02/34653 with reference to FIG. 4 therein, or in a off-axial direction. The abrasive particle inlet 4 for abrasive particles is located at the lower end of the ridge.

The cylindrical separator magnet 7 is formed of four smaller magnets 7a, 7b, 7c, and 7d stacked together. A different number of the smaller magnets can also be used. Each magnet 7a, 7b, 7c, and 7d has diametrically opposed N and S poles, and the magnets are stacked in a manner that adjacent magnets have N-S directions azimuthally rotated with respect to each other about the central longitudinal axis 8 over an angle φ such that two essentially helical diametrically opposing bands are each formed by alternating N and S poles.

Due to the nature of a bipolar magnet, the magnetic field strength in the regions between the N and S poles in each of the smaller magnets 7a, 7b, 7c, and 7d is lower than in the essentially helically aligned regions around the N and S poles. In this way, the helical bands of alternating N and S poles form a high-field band of increased magnetic field strength relative to regions forming low-field band displaced by about 90° in azimuth with respect to that high-field band. In between the high- and low-field bands, there is a gradient zone where the magnetic field strength decreases from the increased value in the high-field band to the value in the low-field band.

The separator magnet 7 has a central longitudinal axis 8 and is rotatable relative to the sleeve 15 and about the central longitudinal axis 8. Drive means are provided (not shown) to drive axis 8 and thereby rotate the separator magnet 7 into either clockwise or counter clockwise rotation as dictated by the sense of the helical band. The drive means may advantageously be provided in the form of an electric motor, which motor may be controlled by a control system (not shown).

A short tapered section 11 is provided at the lower end of magnet 7d. The sleeve 15 is provided with a corresponding conical taper in a manner that the abrasive particle inlet 4 for abrasive particles provides fluid communication between the support surface 15 surrounding the tapered section 11 and the mixing chamber 2. The conical taper is best based on the same angle as the above-discussed angle of the mixing chamber 2 and mixing nozzle 5.

In operation, the tool works as follows. The tool is connected to the lower end of a drill string that is inserted from the surface into a borehole. A stream of drilling fluid is pumped by a suitable pump (not shown) at surface, via the drilling fluid channel of the drill string and the fluid passage 1 into the mixing chamber 2. During initial pumping, the stream is provided with a low concentration of abrasive particles of magnetic material such as steel shot or steel grit.

The stream flows from the mixing chamber 2 to the mixing nozzle 5 and is jetted against the borehole bottom. Simultaneously the drill string is rotated so that the borehole bottom is evenly eroded. A return stream, containing the fluid, the abrasive particles and excavation debris, flows from the borehole bottom through the borehole in a direction back to the surface. Thereby, the return stream passes along the sleeve 15.

Simultaneously with pumping of the stream of drilling fluid, the separator magnet 7 is rotated about its axis 8, in a direction dictated by the sense of the helical bands, which can be either clockwise or counter clockwise. The separator magnet 7 induces a magnetic field extending to and beyond the outer surface of the sleeve 15. As the stream passes along the sleeve 15, the abrasive particles in the stream are separated out from the stream by the magnetic forces from the separator magnet 7 which attract the particles onto the outer surface of the sleeve 15.

The stream of drilling fluid, which is now substantially free from abrasive magnetic particles, flows further through the bore hole to the pump at surface and is re-circulated through the drill string after removal of the drill cuttings.

The magnetic forces exerted to the abrasive particles are lower in the low-field band than in the high-field band. The magnetic particles retained on the support surface 15 are attracted towards the band having the highest magnetic field. Due to rotation of the separator magnet 7 in a direction against the sense of the helical bands, the respective bands and the gradient zone in between exert a force to the magnetic particles in a direction perpendicular to the gradient zone, which has a downward component, thereby forcing the particles to follow a helically downward movement.

As the particles arrive at the abrasive particle inlet 4, the stream of drilling fluid flowing into the mixing chamber 2 again entrains the particles.

Once inside the mixing chamber 2, the particles interact with the stream of drilling fluid passing through the mixing chamber 2 from inlet 3 to mixing nozzle 5, and thereby these particles will be entrained by this stream.

If provided, the magnetic body 14 on the side opposite from the abrasive particle inlet 4 causes magnetic field lines to run from the lower end 11 of the separator magnet to this magnetic body. As a result, the magnetic field gradient from the support surface 15 towards the inside of the mixing chamber 2 becomes less strong, such that entry of the magnetic abrasive particles through abrasive particle inlet 4 into the mixing chamber 2 is facilitated.

In a next cycle the abrasive particles are again jetted against the borehole bottom and subsequently flow through the annulus formed by the tool and the borehole, in the direction to the surface. The cycle is then repeated continuously. In this manner it is achieved the drill string/pumping equipment is substantially free from damage by the abrasive particles as these circulate through the lower part of the drill string only, while the drilling fluid circulates through the entire drill string and pumping equipment. In case a small fraction of the particles flows through the borehole to surface, such fraction can again be replaced via the stream of fluid flowing through the drill string.

Figure 2:
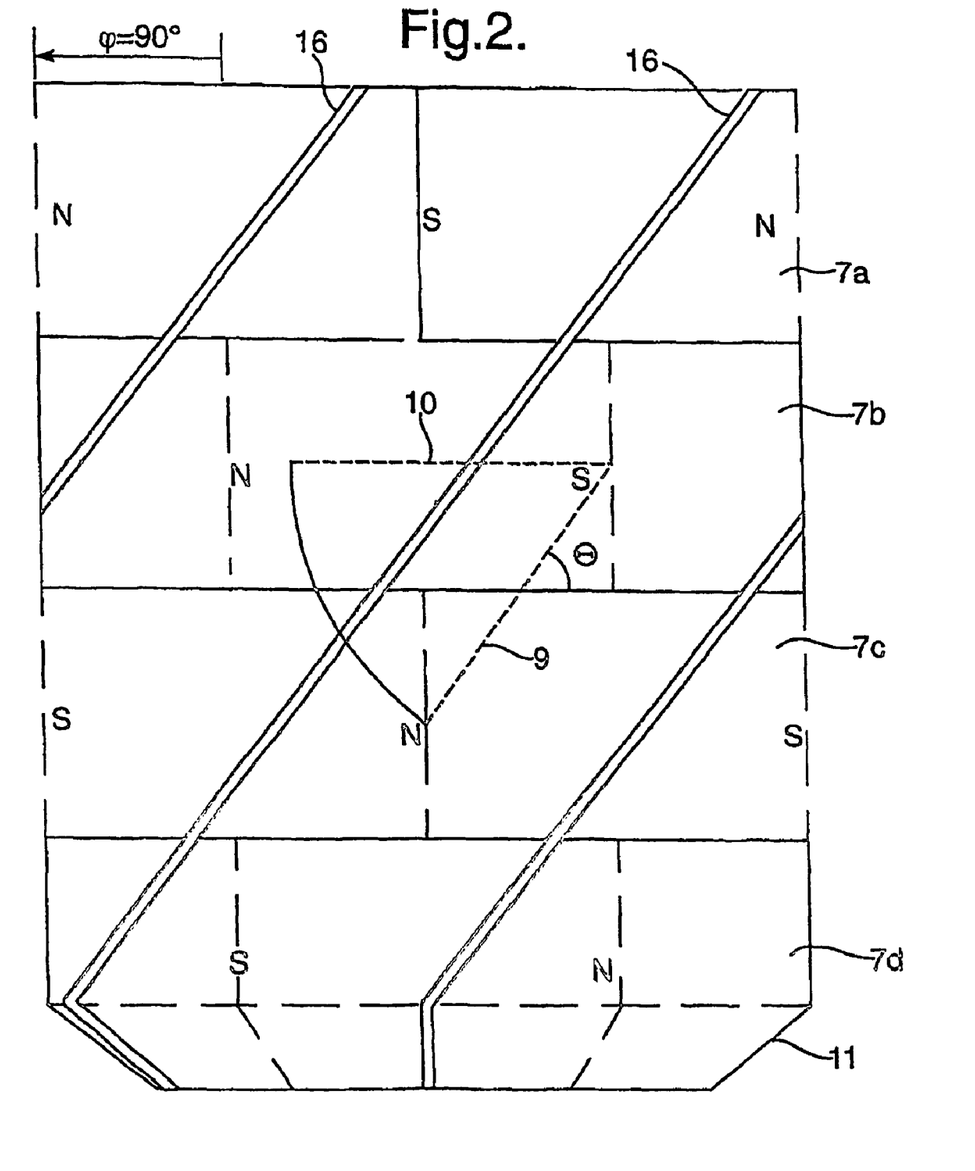
FIG. 2 schematically shows a surface map of a magnet surface arrangement in accordance with an embodiment of the invention.

The separator magnet 7 is also shown in FIG. 2, in a representation wherein the cylindrical surface is unrolled flat in the plane of the paper. Thus vertically is set out the height of the separator magnet, which is divided in smaller magnets 7a, 7b, 7c, and 7d, and horizontally the surface at all azimuths between 0 and 360° is visible. As can be seen, the angle φ in this case is 90° in respect of every one of the smaller magnets in the stack, φ being the azimuth angle difference between the projected N-S directions in two neighbouring smaller magnets. Alternatively, the angle φ can be varied along the magnet stack.

Areas 16 schematically indicate where in the gradient zones the magnetic field strength decreases most steeply from the increased value in the high-field band to the value in the low-field band.

Depending on both φ and the axial height of the smaller magnets, each of the two high-field bands stretches in a direction making an angle θ with respect to the plane perpendicular to the central longitudinal axis as is indicated in FIG. 2. The angle θ can vary along the magnetic stack.

Figure 3:
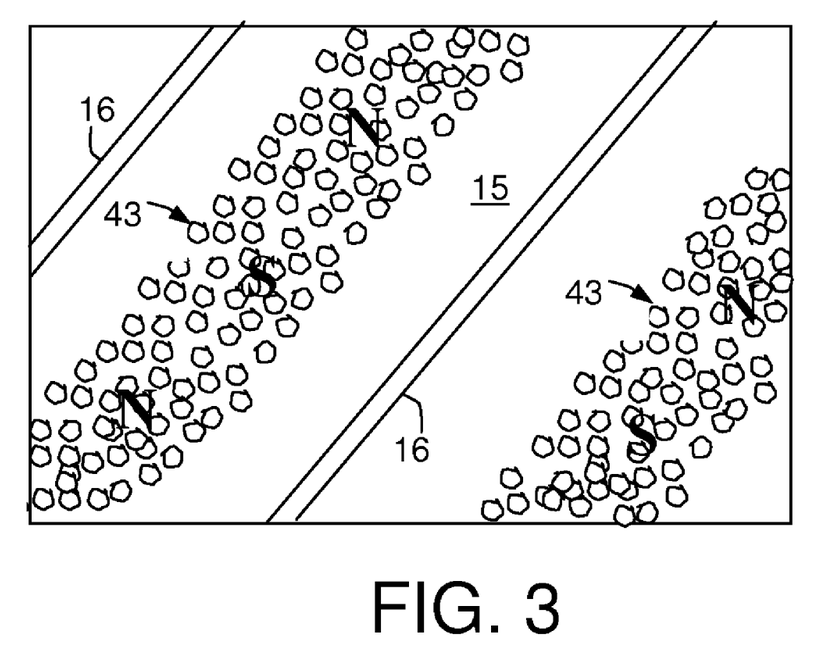
FIG. 3 is a schematic diagram of the surface of a tool as shown in FIG. 1 with an amount of steel shot retained on its support surface.

Magnetic particles retained on the support surface by the separator magnet tend to arrange themselves in elongate chains along a magnetic path from one pole to the nearest pole of opposite polarity.Examples of such chains 43 are shown in visible in FIG. 3. The steel shot arranges itself in chains 43 along the helical high-field band having NNSS poles. The chains 43 between the N and S poles lie flat on the support surface. Chains of shot in the middle of an N or S pole stick out of the support surface since the poles correspond to sources or drains of magnetic field lines.

The shortest magnetic path on the approximately cylindrical surface between two adjacent N and S-pole locations within one high-field band, indicated in FIG. 2 by dotted line 9, is shorter than the shortest path across the approximately cylindrical surface between a S-pole (or N-pole) location in that high-field band and the nearest N-pole (S-pole) location in another high-field band. Thus, the magnetic particles will tend to form a chain along line 9 in alignment with a high-field band. For reference, dotted line 10 is indicated having the same path length as dotted line 9 and it can be seen that this dotted line 10 is too short to bridge the distance from the N pole in the high-field band to the nearest S pole outside the band crossing the gradient zone 16.

The relevant distances are determined on the support surface, since that is approximately the distance over which the chains of particles would grow.

Figure 4A:
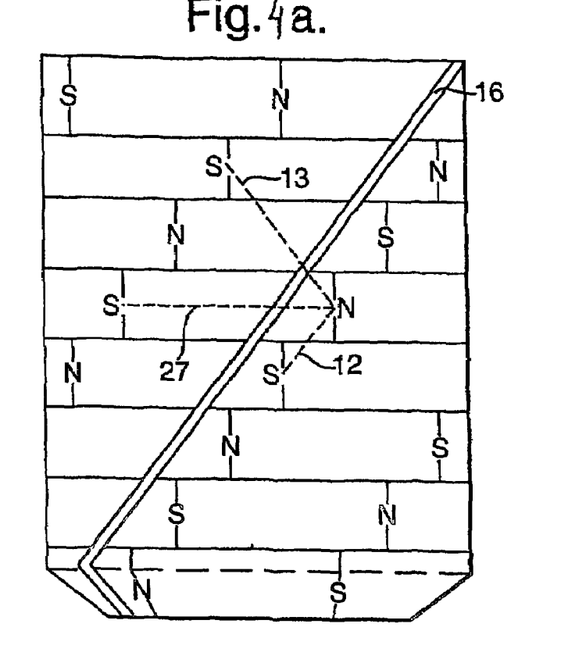
FIG. 4 (parts a to c) schematically shows various alternative magnet surface arrangements in accordance with an embodiment the invention.
Figure 4B:
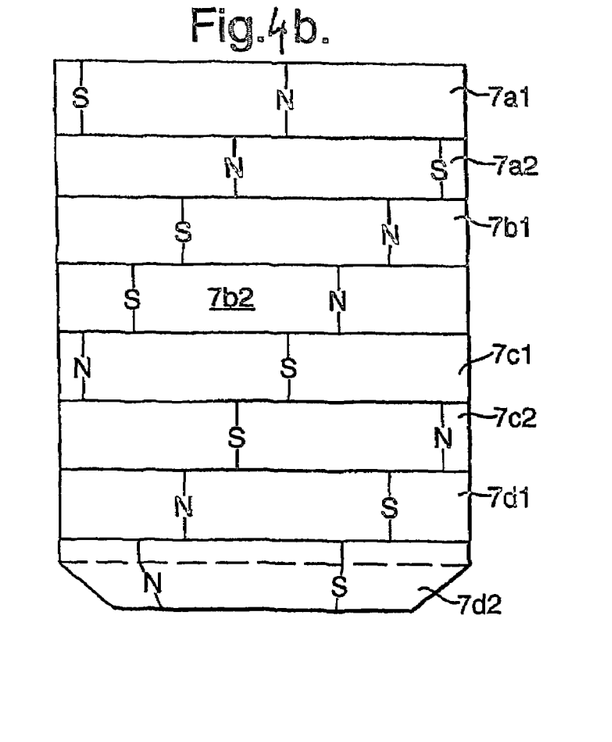
Figure 4C:
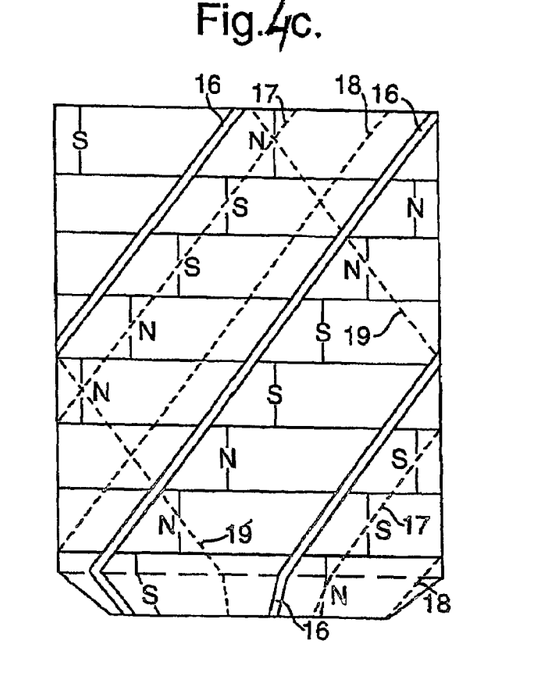

FIGS. 4a, 4b, and 4c show alternative magnet arrangements in accordance with the invention, also for counter clockwise rotation. The embodiment shown in FIG. 4a is similar to the one of FIG. 2, but with the smaller magnets having a smaller size in the stacking direction along the longitudinal axis relative to the lateral size in the plane perpendicular to the stacking direction. Since the bridging distance for a particle chain between two opposite poles within a high-field band (represented by dotted line 12) is much shorter than the bridging distances (represented by dotted lines 13 and 27) from a pole inside this high-field band to a pole of opposite polarity on the other side of the gradient zone 16, it is expected that the particles will from chains aligning with the high-field bands in the direction of line 12. The difference in these distances is more pronounced than in the embodiment of FIG. 2. It will be discussed below in more detail that, while having equal size and energy content, this magnet arrangement has a smaller reach than the one of FIG. 2.

In the embodiment of FIG. 4b, the poles within a band are not arranged alternatingly with each smaller magnet, but each time two poles of the same type are arranged adjacent to each other. This embodiment is thus based on the stack of the four smaller magnets 7a, 7b, 7c, 7d, of FIG. 2, with the modification that each of the four smaller magnets is divided into two or more even smaller magnets (in the example of FIG. 4b the four smaller magnets are divided into two even smaller magnets 7a1 and 7a2; 7b1 and 7b2; 7c1 and 7c2; 7d1 and 7d2) of which the individual poles are azimuthally displaced with respect to each other. The magnetic poles (in the sense of an area appearing as a source or a sink for magnetic field lines) are assembled from groups of individual poles, whereby an individual pole is defined as a spot within a magnetic pole where the field line density reaches a maximum. The individual poles are also arranged in a helically shaped manner, preferably coincident with the helical arrangement of the band, so that the magnetic poles themselves get a pseudo-helical appearance.

The embodiment shown in FIG. 4c is a hybrid form combining elements from FIG. 4a and FIG. 4b. Within one helical band, the individual poles appear in the order of NSSNNSSN or SNNSSNNS. This has the advantage that in the middle portion of the separator magnet, the poles formed by neighbouring N-N and S-S pole combinations are pseudo-helically shaped in conformity with the helical arrangement of the band.

At the same time the magnetic poles formed by the first and last of the smaller magnets in the stack are smaller in the stacking direction than the magnetic poles in the middle portion of the separator magnet. This has the advantage that the magnetic path from the top most or the bottom most magnetic pole in the high-field band can find its nearest magnetic pole of opposite polarity in the same high-field band, whereas in the case of FIG. 4b this condition is not always fulfilled for the first and last individual poles. To ensure that the path between the N and S poles within the high-field band is even smaller, the first and last of the smaller magnets in the axial stack have a smaller axial height than the smaller magnets in a middle portion of the separator magnet.

Figure 5:
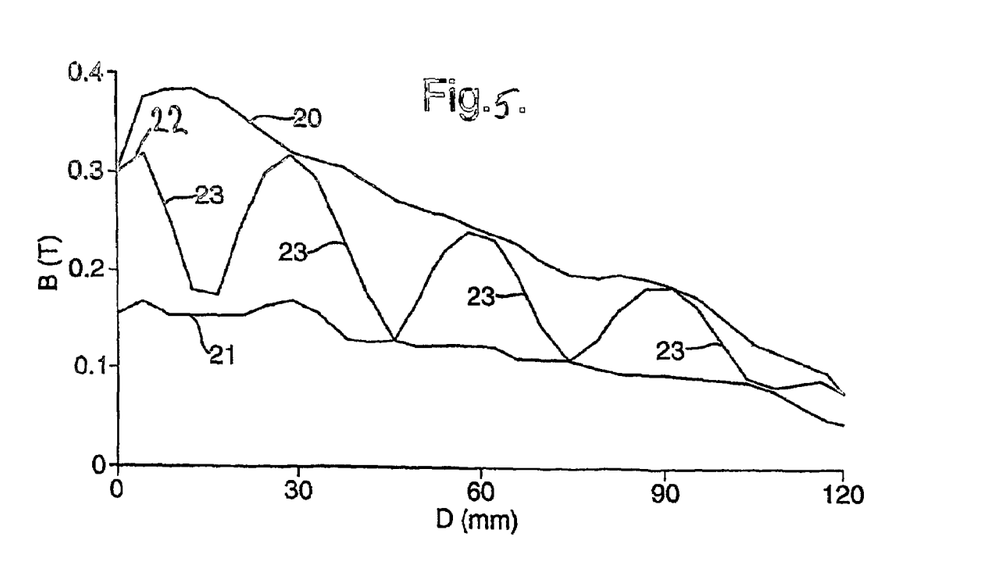
FIG. 5 shows a calculation of the magnetic field on the support surface as a function of axial distance along the magnetic axis.

FIG. 5 shows calculations of the magnetic field strength B (in Tesla) on the support surface 15 of a conically tapered support member such as is depicted in FIG. 1, that is generated by a cylindrical separator magnet 7 of which the smaller magnets are arranged in accordance with FIG. 4c. The magnetic field strength is plotted against the vertical axis, and the axial height parallel to the magnet axis 8 is plotted against the horizontal axis. The dimensional parameters are given in Table I.

TABLE I

| Part name | Reference number | size |
| --- | --- | --- |
| Axial length of separator magnet | 7 | 120 mm |
| Outer diameter of separator magnet | 1 | 29 mm |
| Diameter in lower part of support surface | 15 | 34 mm |
| Diameter in upper part of support surface | 15 | 52 mm |

Line 20 in FIG. 5 corresponds to the magnetic field strength found along a helical path within the high-field band of increased magnetic field strength, which path is depicted by the dashed lines 17 in FIG. 4c. It can be seen that the field strength generally increases. This is a result of the decreasing gap width between the outer magnet surface and the support surface 15 as a function of position on the helical high-field band.

Line 21 in FIG. 5 corresponds to the magnetic field strength found along a helical path within the low-field band (which in this example is displaced 90° from path 17 in azimuthal direction), which path is depicted by the dashed lines 18 in FIG. 4c. The magnetic field strength in the low-field band is found to be approximately half that of the high-field band, which is a result of the nature of the bipolar smaller magnets. It can also be seen that the field strength generally increases. This is a result of the decreasing gap width between the outer magnet surface and the support surface 15.

Line 22 in FIG. 5 corresponds to the magnetic field strength found along an anti-helical path, which path is depicted by the dashed lines 19 in FIG. 4c. This path crosses the above-mentioned paths 17 and 18, and the magnetic field strength oscillates between the values given in the high- and low-field bands. Reference number 23 indicates the gradient zones that exert the driving force that causes the desired transport of the magnetic particles, when the gradient zones are being advanced relative to the support surface.

Similar to lines 20 and 21, also line 22 in FIG. 5 shows a generally increasing magnetic field strength with smaller axial height, which is a result of the decreasing gap width between the outer magnet surface and the support surface. This provides a significant additional force component on the magnetic particles in the axial direction, which enhances the transport of the particles in that direction.

Other ways to increase the magnetic field strength on a trajectory along the support surface in the selected direction of transport include reducing the wall thickness of the support sleeve and increasing the strength of the separator magnet with decreasing axial height on the separator magnet. The latter can be done by increasing the outer diameter of the smaller magnets relative to the support surface, or increase the magnetic field strength of the smaller magnets. The latter can be done by stacking magnets of various different magnetic materials, or by using an internal hole inside the smaller magnets of which the diameter is chosen smaller for the smaller magnets that should be stronger. Of course, a combination of the above described measures, including the tapered support surface, can be applied.

Figure 6:
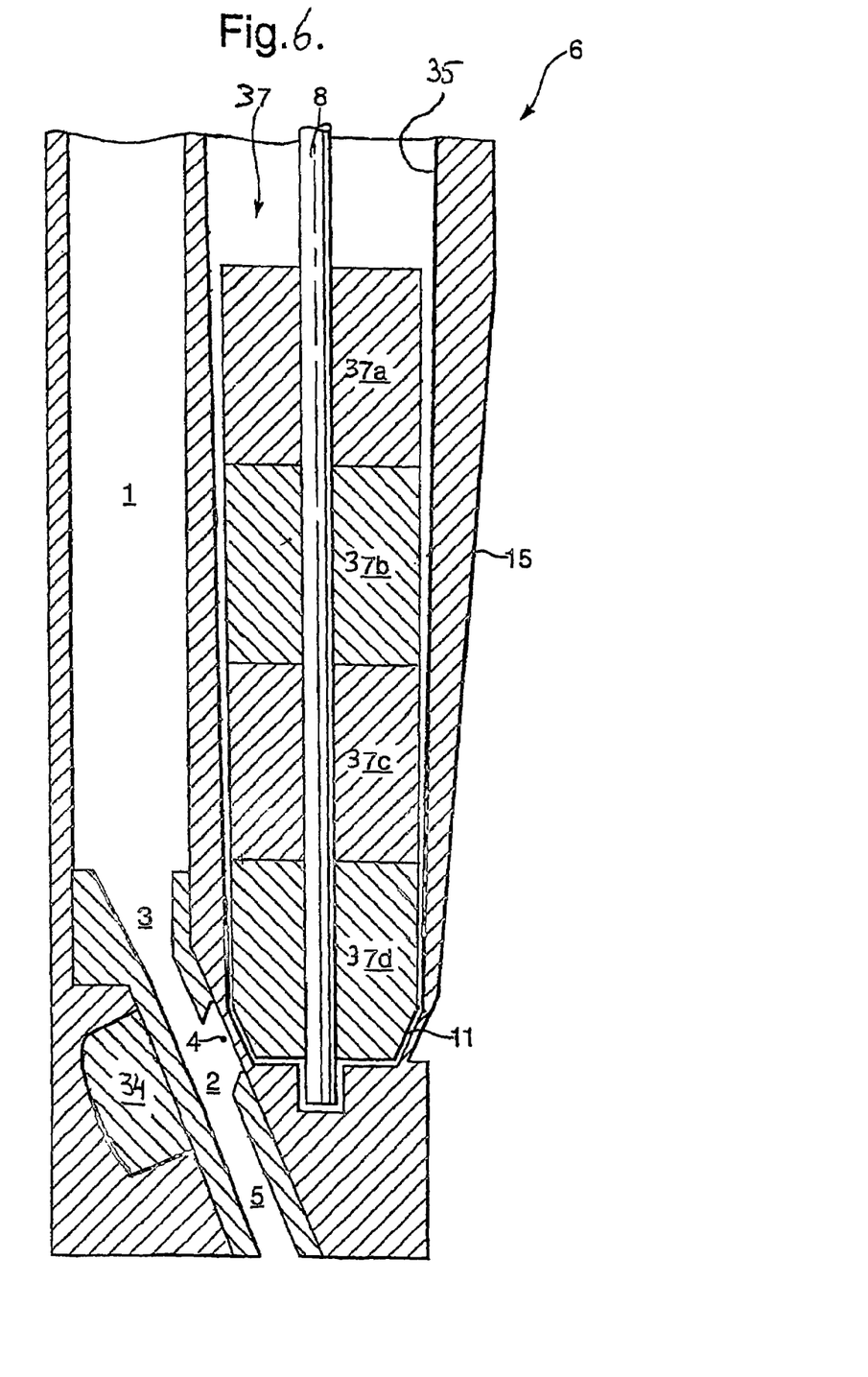
FIG. 6 schematically shows an embodiment having a conical separator magnet and a conical support surface.

FIG. 6 shows a device similar to the device shown in FIG. 1. The separator magnet 37 and the inside wall 35 of the support sleeve 15 are slightly different from the embodiment of FIG. 1, in that both the outer diameter of the separator magnet 37 and the inner diameter of the inside wall 35 reduce with decreasing axial height. The smaller magnets 37a to 37d are of a frustoconical shape to obtain the tapered shape of the separator magnet 37. The gap between the separator magnet 37 and the inside wall 35 of the support sleeve 15 decreases, as well as the wall thickness of the support sleeve. An advantage of this embodiment is that the capture length to be overcome by the separator magnet is reduced compared to the bore hole. Moreover, the total magnetic energy in the separator magnet can be increased to increase the capture efficiency.

Also slightly different is the shape of the optional body of magnetic material 34, which here appears as a pellet located on the side opposite from the abrasive particle inlet 4. This type can also be utilized in an embodiment of the device having a cylindrical separator magnet.

In absence of any mechanical guiding means on the support surface 15, such as ridges protruding from the support surface 15, the magnetic particles follow a helical path along the support surface in a downward direction perpendicular to the helical bands. The downward axial component of the velocity of transport is proportional to the rotational speed of the separator magnet times $\sin(\theta)$ times $\cos(\theta)$ where $\theta$ is the angle between the helical gradient zone and the plane perpendicular to the axis of rotation which coincides with the central longitudinal axis of the separator magnet 7 as is indicated in FIG. 2. Thus the downward axial component is maximal for $\theta=45°$ in absence of any mechanical guiding means on the support surface 15. A good range for operating is 32° to 58°, within which range the downward component of the velocity is more than 90% of the possible maximum.

However, in the embodiment shown in FIG. 1, the drilling fluid bypass guide 1 is formed in a ridge in the axial direction in contact with the support surface 15. This ridge deflects the magnetic particles moving on the support surface 15 in a downward helical path and forces them to move in axial direction along the side of the ridge in a straight path towards the abrasive particle inlet opening 4 of the mixing chamber 2. This way, the drilling fluid passage 1 acts as a guide means to guide magnetic abrasive particles retained on the support surface 15 to the abrasive particle inlet 4 for abrasive particles.

This arrangement has the advantage that the transport of the magnetic particles to the abrasive particle inlet opening 4 can be faster than when the magnetic particles follow the downward helical trajectory. The downward axial component of the velocity of transport is now proportional to the rotational speed of the separator magnet divided by $\tan(\theta)$. At the before-mentioned angle of $\theta=45°$, the axial transport is already a factor of two faster. Higher values for $\theta$ yield an even higher axial velocity component along the side of the ridge. However, it has been found that when $\theta$ is too large, for instance exceeding 60°, the total efficiency of the recirculation system drops as a result of friction between the particles and the support surface 15 and the ridge.

For the embodiment of FIG. 1, $\theta$ should preferably be within the range of 40° to 60°, more preferably between 45° and 60°, and most preferably between 45° and 55°.

In a preferred embodiment, the device for transporting particles comprises one or more relatively short essentially axially oriented ridge sections are provided onto the support surface whereby the support surface extends beyond the ridge sections in the direction of the ridge sections. Herewith a more homogeneous distribution of the magnetic particles over the support surface is achieved as well as an improvement of the axial transport velocity of the magnetic particles over the support surface.

In each of the magnets 7 described above, the high- and low-field bands were formed by virtue of the field distribution of bipolar cylindrical magnets. This results in bands of increased magnetic field strength. Magnetic particles retained on the support surface react most directly to the advancement of the gradient zone if the change in the magnetic field in the gradient zone is large. To achieve this, the low-field band preferably corresponds to a region of reduced magnetic permeability of the separator magnet and/or a gap between the separator magnet and the support surface. Herewith a more abrupt gradient zone between high- and low-field bands is achieved.

Figure 7A:
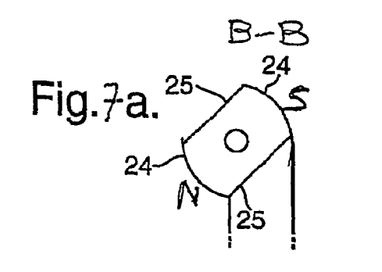
FIG. 7 (parts a to c) schematically shows a magnet arrangement provided with helical grooves.

FIG. 7 shows an embodiment wherein the region of reduced magnetic permeability is provided in the form of a helical recess 26 in the outer surface of the separator magnet 7 adjacent to the high-field band. Due to the higher magnetic permeability of the magnet material than the less magnet material that fills up the recesses (a gas, a fluid, or a solid) the internal magnetic field lines predominantly follow the material of the magnet rather than the material contained in the recess. This makes the high-field band of increased magnetic field strength, adjacent the recess 26, more pronounced. FIG. 7a shows a cross section of the separator magnet, which shows circular contours 24 around the diametrically opposing poles, connected by essentially straight contours 25. The straight contours correspond with the recess 26 and the circular contours with the high-field bands of increased magnetic field strength.

Figure 7B:
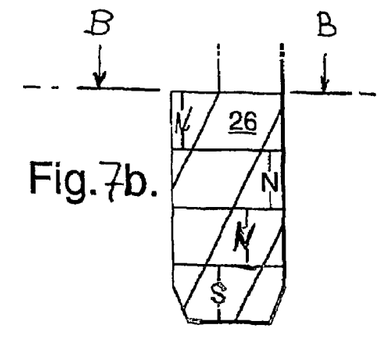
Figure 7C:
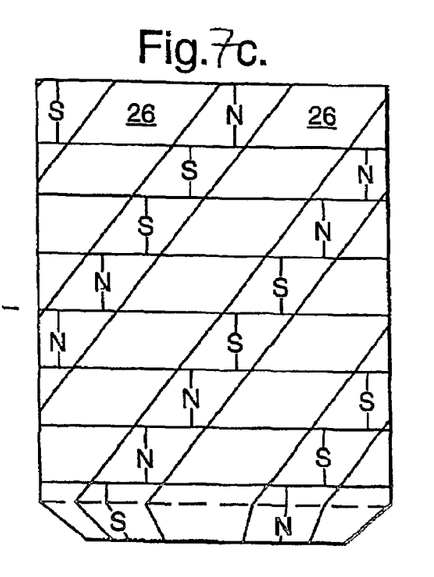

In FIG. 7b a schematic longitudinal view is provided of the separator magnet, whereby the slanted phantom lines indicate the transition between the circular contours and the essentially straight contours. FIG. 7c provides a schematic representation of the entire surface in the same way as in FIG. 2. The angle $\theta$ of the helical recess is 53°.

Preferably, the recess reaches a depth with respect to the cylindrical circumference of the separator magnet that is similar as or greater than the distance between the gap between the magnetic surface in the high-field band and the support surface.

Instead of the recesses containing a gas, fluid or solid, there can be vacuum in the grooves.

It will be appreciated that the arrangement of the poles of FIG. 7 can be replaced by other suitable arrangements, and in particular with the arrangements as shown in FIGS. 2 and 4a and 4b. It will also be clear that the separator magnets as shown in FIGS. 2, 4, and 7 for counter clockwise rotation can also be prepared for clockwise rotation by inverting the sense of the helical bands from right to left handed.

Suitable magnets for the device for transporting particles of a magnetic material and for the described recirculation system can be made from any highly magnetisable material, including NdFeB, SmCo and AlNiCo-5, or a combination thereof.

Preferably the separator magnet also has a magnetic energy content of at least 140 kJ/m$^3$ at room temperature, preferably more than 300 kJ/m$^3$ at room temperature such as is the case with NdFeB-based magnets. A high energy content allows for shorter axial contact length of the support surface with the return stream, and consequently a stronger taper of the support surface which is advantageous for the axial transport rate. Also, less power is required for the rotation of the separator magnet.

The sleeve 15 and the drilling fluid bypass 1 are normally made of a non-magnetic material. They are suitably machined out of a single piece of the material in order to obtain optimal mechanical strength. Super alloys, including high-strength corrosion resistant non-magnetic Ni-Cr alloys including one sold under the name Inconel 718 or Allvac 718, have been found to be particularly suitable. Inconel 718 is a precipitation hardenable alloy having a composition within ranges given in Table II. Other materials can be used, including BeCu.

TABLE II composition Inconel 718 in wt. %

| Element | Min. | Max. | Typical |
|---|---|---|---|
| Ni + Co | 50.0 | 55.0 | 53.0 |
| Fe | Balance | | 18.5 |
| Cr | 17.0 | 21.0 | 18.6 |
| Mo | 2.80 | 3.30 | 3.1 |
| Al | 0.35 | 0.80 | 0.4 |
| Ti | 0.65 | 1.15 | 0.9 |
| Cu | | 0.15 | 0.05 |
| Mn | | 0.35 | 0.2 |
| Si | | 0.35 | 0.3 |
| C | | 0.08 | 0.04 |
| P, S | | 0.015 | — |
| B | | 0.006 | — |
| Nb + Ta | 4.75 | 5.5 | 5.0 |

In order to avoid too high a reaction torque on the separator magnet during rotation, the generation of eddy-currents in the sleeve 15 should be controlled. To this end the electric resistivity of the material is preferably higher than 50 $\mu\Omega$cm. Herewith a sleeve can be made, sufficiently thick for downhole application, whereby the additional torque, up to a rotary frequency of 10 Hz of the separator magnet 7, approaches the torque necessary to overcome the friction of a normal amount of abrasive particles on the support surface. More preferably the resistivity is higher than 100 $\mu\Omega$cm, to enable a higher frequency of about 40 Hz. For instance, Inconel 718 has a resistivity of approximately 122 $\mu\Omega$cm, which in a tool of the size as given in Table I has been calculated and measured to result in a torque of 6 Ncm at 15 Hz.

Figure 8:
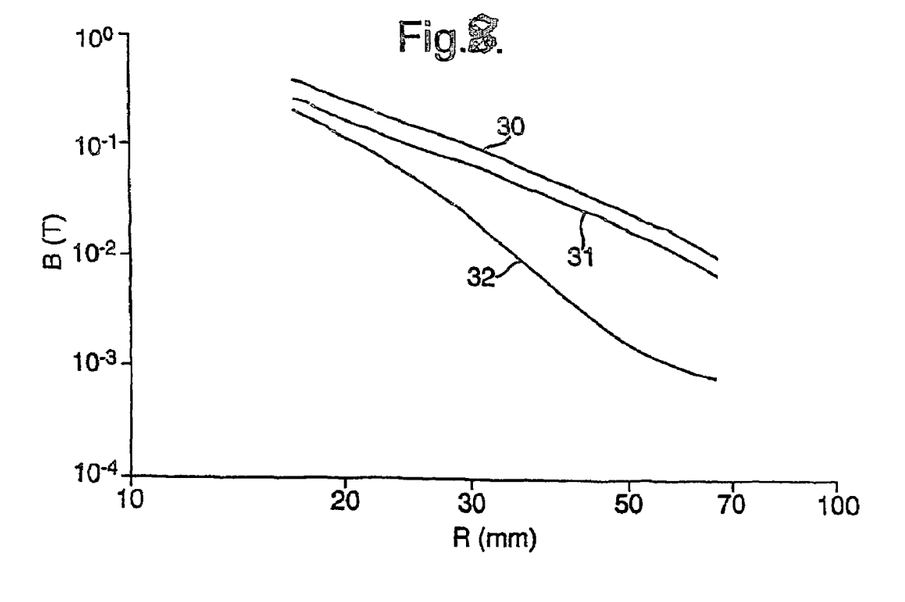
FIG. 8 shows a calculation of the radial decay of the magnetic field for various magnets.

FIG. 8 shows on a log-log plot the calculated radial decay of the magnetic field for the separator magnet of FIG. 4b

(curve 30), for the separator magnet of FIG. 4*c* (curve 31), and for the separator magnet of FIG. 4*a* (curve 32). On the horizontal scale is plotted the radial distance from the magnet axis and on the vertical scale the magnetic field. As can be seen, magnets with, on average, larger magnetic poles (a pole arrangement such as in FIGS. 4*b* and 4*c*) of the same polarity (in axial direction) have a longer magnetic reach than magnets with shorter magnetic poles (a pole arrangement such as in FIG. 4*a*).

Figure 9:
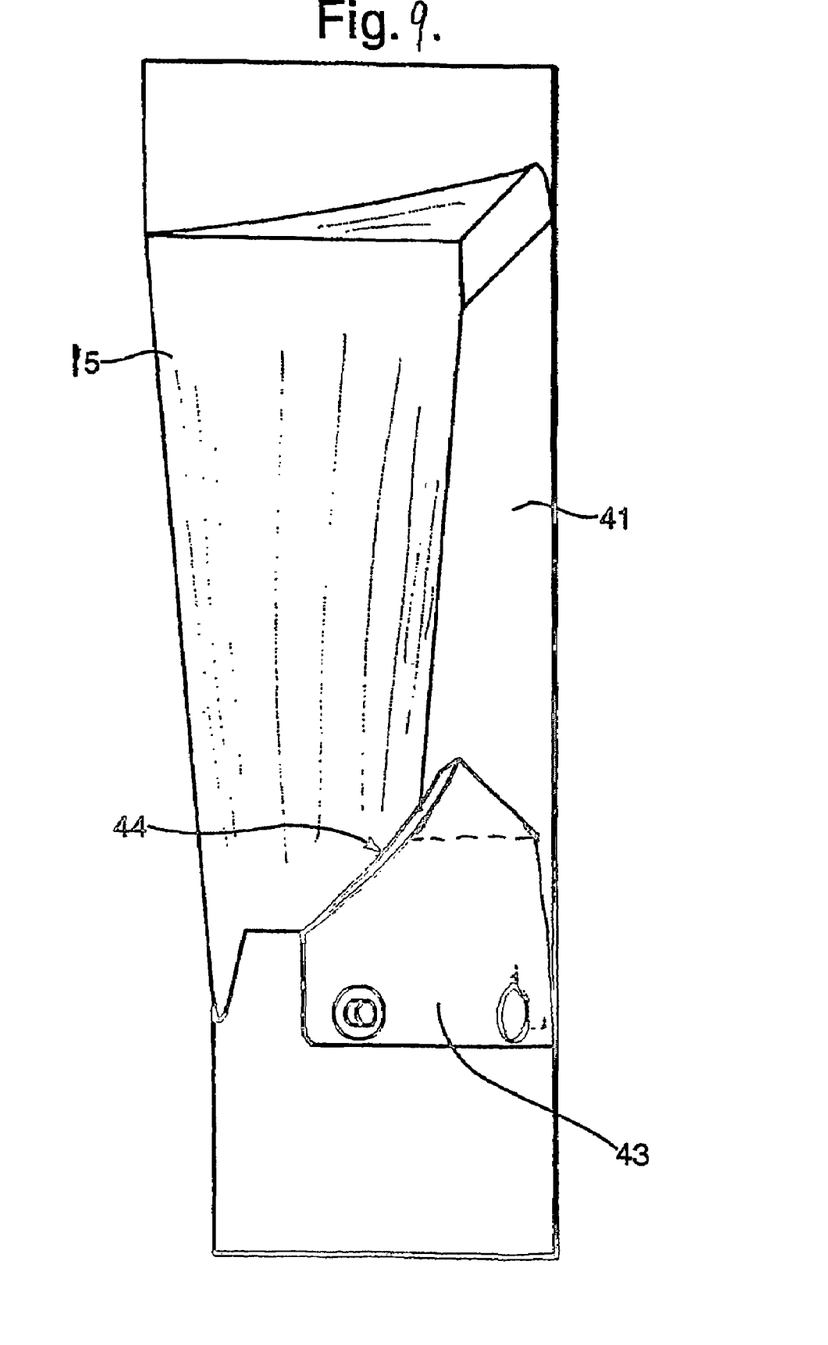
FIG. 9 shows a schematic view of a tool for excavating an object.

FIG. 9 shows a schematic view of a tool for excavating an object, including a recirculation system as described above. Visible are the conically shaped support surface 15 housing the separator magnet, and the ridge 41 housing the bypassing drilling fluid passage. The dimensions correspond to those given in Table I.

Referring to FIG. 9, filtering means are optionally provided in the form of a skirt 43, shielding the abrasive particle inlet 4 from the annulus and creating an opening 44 in the form of a slit between the skirt 43 and support surface 15. The support surface 15 and the inside surface of skirt 43 define a passage channel connecting the abrasive particle inlet 4 with the bore hole annulus. This skirt arrangement avoids that rock grains larger than the size of the access window of abrasive particle inlet 4 enter the passage channel.

This arrangement of the skirt 43 also guides the flow of drilling fluid from the bore hole annulus to the mixing chamber 2, along the support surface 15 in the direction of the desired transport. In order to entrain sufficient drilling fluid with the flow of magnetic particles, the velocity of the drilling fluid in the bore hole annulus should preferably not exceed 3 m/s. Optionally, additional slots or openings are provided in the skirt wall on the annular side.

The skirt 43 as it appears in FIGS. 3 and 9 is suitable for use in combination with a counter clockwise rotatable separator magnet. It will be clear that for a tool with a clockwise rotatable separator the skirt must be provided on the other side of the abrasive particle inlet.

A jet pump mechanism in the mixing nozzle 5 generates a strong flow of drilling fluid from the mixing chamber 2 to the mixing nozzle 5. The jet pump mechanism auxiliarily supports the flow of magnetic particles into the mixing chamber 2. A larger diameter of the mixing nozzle 5 compared to a drilling fluid inlet nozzle (between inlet 3 and the mixing chamber 2) results in adequate entrainment of drilling fluid and the magnetic abrasive particles entering into the mixing chamber via abrasive particle inlet 4. The interaction between the entrained drilling fluid and the magnetic particles contributes to the efficiency of the release of particles from the support surface 15 into the mixing chamber 2 as well.

When excavating a bore hole in an earth formation, the return stream of drilling fluid in the bore hole annulus (formed by the bore hole wall and the excavating tool) may pass the recirculation system at a velocity of 2 m/s or even higher. The reach of the magnetic field into the bore hole annulus should exert a pulling force on the particles sufficiently strong to pull them to the support surface before they have passed the device. At the same time, the magnetic force pulling the particles onto the housing should be as low as possible in order to minimise friction forces and power requirements for rotating the separator magnet. The most suitable separator magnet is one that has an as high as possible coefficient for the lowest dominant radial polar moment, which is typically a separator magnet having a dominant dipole behaviour over a quadrupole behaviour for a certain energy content. As confirmed by FIG. 8, this is best achieved in the pole arrangement of FIG. 4*c*, where the periodicity of magnetic poles of opposite polarity is as small as acceptable in view of the requirement that the magnetically nearest magnetic pole of opposite polarity must be inside the band.

In order to achieve the best capture efficiency of the recirculation system, the separator magnet is preferably located in the axial centre of the bore hole. In a typical bore hole, a small axial offset of up to 15% of the diameter of the excavation tool is acceptable. The embodiment shown in FIG. 9 has an axial offset of the separator magnet contained axially inside the support surface 15 of 10%, or approximately 7 mm for a targeted 70 mm diameter bore hole.

The drilling fluid in the mixing mixing nozzle 5, or in the abrasive jet, may contain a concentration of typically up to 10% by volume of magnetic abrasive particles. A typical concentration of magnetic abrasive particles that is supplied via the bypass conduit 1 lies between 0.1 and 1% by volume. The separator magnet is typically driven at a rotational frequency of between 10 and 40 Hz.

I claim:

1. A device for transporting particles containing a magnetic material in a selected direction, the device comprising:
    a support member having a support surface for supporting the particles, the support surface extending in the selected direction;
    a separator magnet arranged to generate a magnetic field for retaining the particles on the support surface whereby the magnetic field on the support surface is arranged to have a high-field band, a low-field band, and a magnetic field gradient in a gradient zone between said high- and low-field bands whereby the magnetic field strength in the high-field band is higher than that in the low-field band;
    means for advancing the high- and low-field bands relative to the support surface in a direction having a component in the direction of the magnetic field gradient on the support surface, whereby the high-field band is followed by the low-field band;
    wherein at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

2. The device of claim 1, wherein the separator magnet is a composite magnet comprising a plurality of magnetic building blocks stacked together in a selected stacking direction.

3. The device of claim 2, wherein the magnetic building blocks each have a projected North-South axis formed by a component of an internal magnetic field along a plane perpendicular to the selected stacking direction.

4. The device of claim 3, wherein the projected North-South axes of the stacked magnetic building blocks intersect the high-field band.

5. The device of claim 4, wherein the first magnetic pole and the second magnetic pole are each formed by groups of individual poles of one or more of the stacked magnetic building blocks.

6. The device of claim 4, wherein the first and/or the second magnetic pole is/are formed by a plurality of stacked magnetic building blocks.

7. The device of claim 1, wherein said means for advancing the bands relative to the support surface in the direction having the component in the direction of the magnetic field gradient on the support surface, is provided in the form of drive means for rotating the separator magnet around an axis parallel to the selected stacking direction relative to the support surface.

8. The device of claim 1, wherein the gradient zone is helically arranged around the separator magnet.

9. The device of claim 1, wherein the low-field band corresponds to a recess provided in the outer surface of the separator magnet.

10. The device of claim 1, wherein the magnetic field in the gradient zone generally increases on a trajectory on the support surface in the selected direction of transport.

11. The device of claim 1, wherein the support surface extends around the magnet leaving distance between the support surface and the outer surface of the separator magnet, whereby said distance in a first location on the support surface is smaller than said distance in a second location on the support surface, the first location being downstream in the selected direction with respect to the second location.

12. The device of claim 11, wherein the support surface is arranged in a tapered fashion around the separator magnet.

13. A tool for excavating an object, the tool comprising a jetting system arranged to impinge the object to be excavated with a jetted stream of a fluid mixed with abrasive particles comprising a magnetic material, the jetting system being provided with at least an abrasive particle inlet allowing entrance of abrasive particles into the jetting system, the tool further comprising a recirculation system arranged to recirculate at least some of the abrasive particles, from a return stream of the fluid mixed with the abrasive particles downstream impingement of the jetted stream with the object back to the jetting system, the recirculation system comprising a device for transporting particles containing a magnetic material in a selected direction, the device comprising:

a support member having a support surface for supporting the particles which is exposed to said return stream for transporting the abrasive particles from the return stream to the inlet, the support surface extending in the selected direction;

a separator magnet arranged to generate a magnetic field for retaining the particles on the support surface whereby the magnetic field on the support surface is arranged to have a high-field band, a low-field band, and a magnetic field gradient in a gradient zone between said high- and low-field bands whereby the magnetic field strength in the high-field band is higher than that in the low-field band;

means for advancing the high- and low-field bands relative to the support surface in a direction having a component in the direction of the magnetic field gradient on the support surface, whereby the high-field band is followed by the low-field band;

whereby along said high-field band at least a first magnetic pole and a second magnetic pole of opposite polarity are arranged such that a first magnetic path on the support surface from the first magnetic pole to the second magnetic pole is shorter than a second magnetic path on the support surface crossing the gradient zone from the first magnetic pole to any other nearest magnetic pole of opposite polarity.

14. The tool of claim 13, wherein the support surface is provided with a ridge on the support surface guiding the abrasive particles to the second inlet.

15. The tool of claim 13, wherein the jetting system is fluidly connected to a bypass conduit arranged inside the ridge for supplying the jetting system with the fluid.

* * * * *